C. H. KLEINHEIM.
PIPE PULLER.
APPLICATION FILED SEPT. 9, 1915.
1,174,993.
Patented Mar. 14, 1916.
2 SHEETS—SHEET 1.
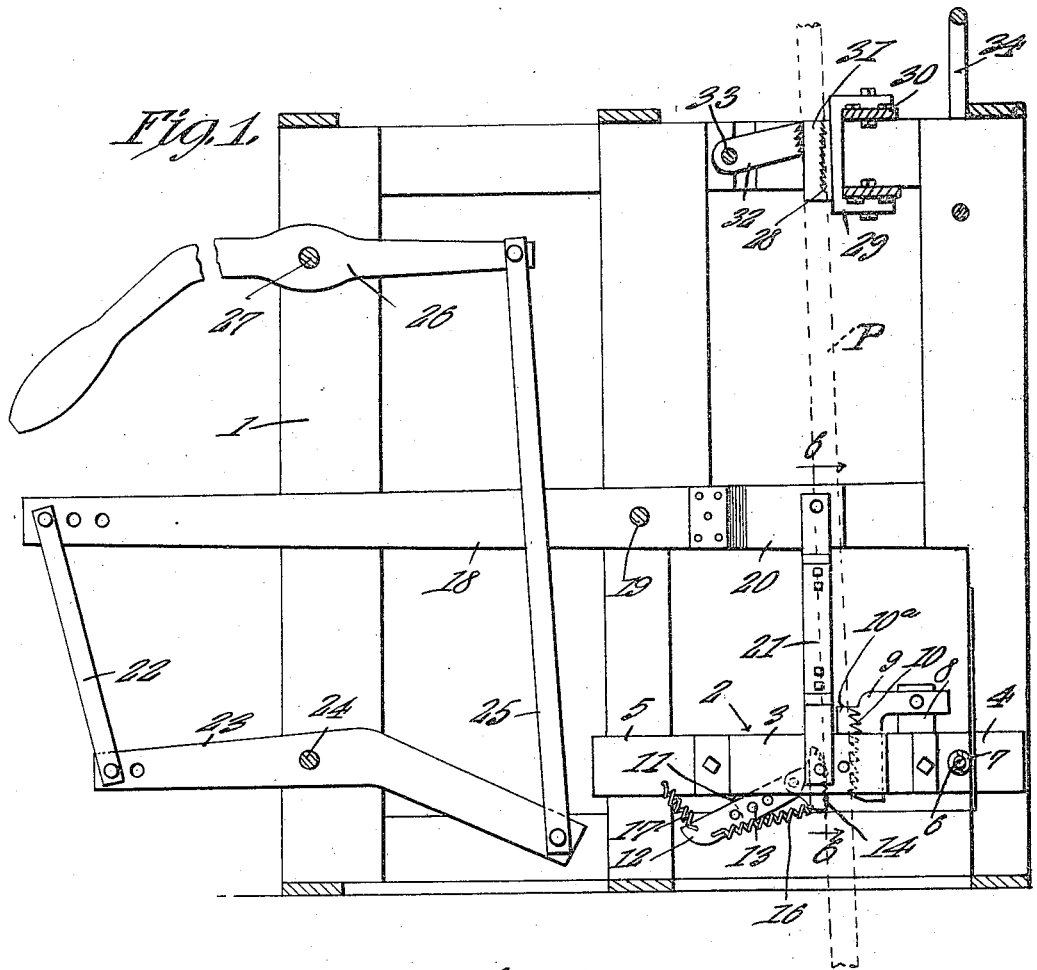
Witnesses
C. H. Kleinheim,
Inventor
by
Attorneys

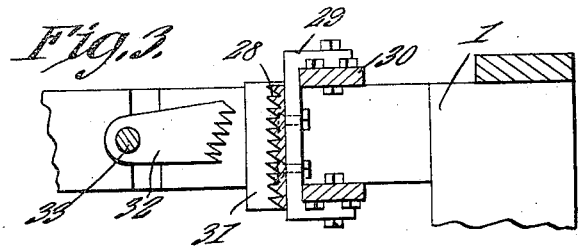
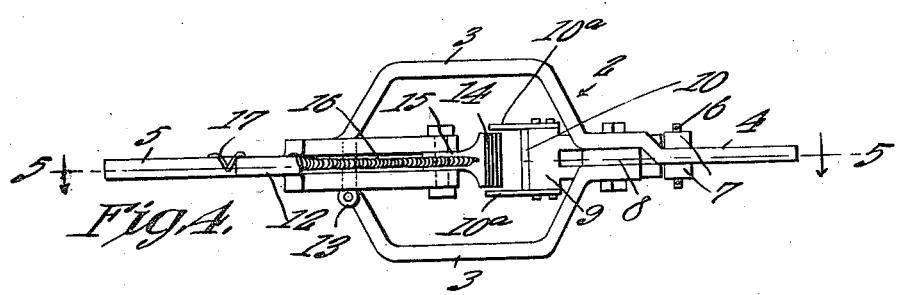
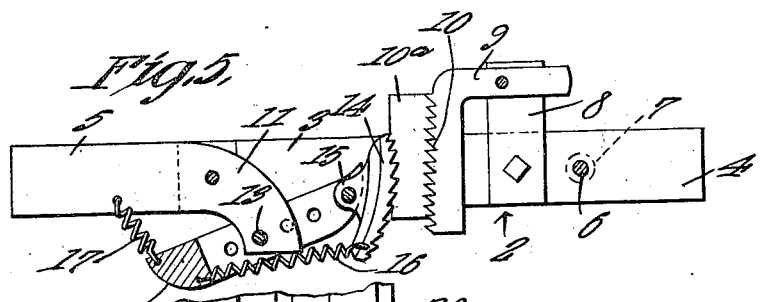
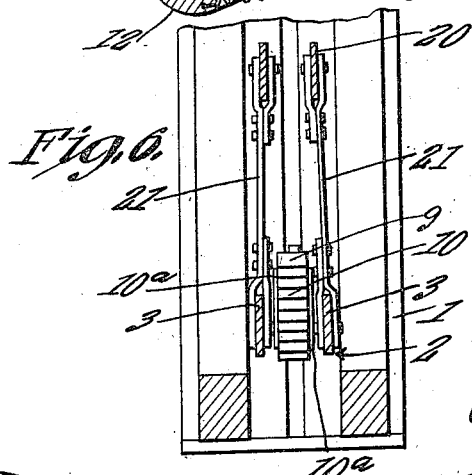
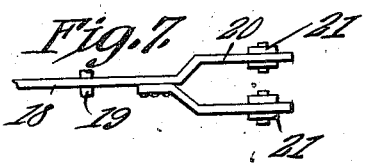

UNITED STATES PATENT OFFICE.

CHARLES H. KLEINHEIM, OF WICHITA, KANSAS.

PIPE-PULLER.

1,174,993.  Specification of Letters Patent.  Patented Mar. 14, 1916.

Application filed September 9, 1915. Serial No. 49,730.

*To all whom it may concern:*

Be it known that I, CHARLES H. KLEINHEIM, a citizen of the United States, residing at Wichita, in the county of Sedgwick and State of Kansas, have invented a new and useful Pipe-Puller, of which the following is a specification.

The present invention appertains to pipe pullers, and aims to provide a novel and improved device adapted for lifting or pulling pipes from wells, and for pulling pipes or equivalent objects for various purposes.

It is the object of the invention to provide a pipe puller embodying a frame having pipe gripping means for preventing the retrograde movement of the pipe, and movable pipe gripping means of novel construction for engaging the pipe and reciprocated by an operating mechanism whereby the pipe is pulled through the frame in an effective manner.

It is also within the scope of the invention to provide a pipe puller having the characteristics above noted, and which at the same time, is comparatively simple and inexpensive in construction, as well as being serviceable, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a vertical section of the device taken on the line 1—1 of Fig. 2. Fig. 2 is a top plan view. Fig. 3 is an enlarged detail view of the stationary pipe gripping means carried by the frame. Fig. 4 is an enlarged bottom view of the movable pipe gripping means. Fig. 5 is a section on the line 5—5 of Fig. 4. Fig. 6 is a vertical section taken on the line 6—6 of Fig. 1. Fig. 7 is a fragmental plan view of the lever for actuating the movable pipe gripping means.

In carrying out the invention, there is employed a suitable frame 1 constructed of wood or other suitable material. Mounted for sliding movement within the frame 1 is a yoke 2 carrying the movable pipe gripping means. This yoke embodies a pair of bars 3 having their intermediate portions offset or bent away from one another, and having their terminals secured together in any suitable manner, one terminal of one of the bars 3 being extended as at 4. A plate or bar 5 is secured between those terminals of the bars 3 remote from the extension 4, and projects from said bars 3 in a direction opposite to the direction in which the extension 4 projects. The plate and extension 4 provide guide wings disposed or fitting slidably within the frame to guide the yoke 2 for reciprocatory movement. A pin 6 is engaged through the extension or wing 4 and has a pair of rollers 7 mounted thereon at the opposite sides of the extension 4, said rollers bearing against the respective portion of the frame to assist in guiding the yoke 2 for sliding movement with a minimum amount of friction.

A plate or standard 8 is secured between those terminals of the bars 3 remote from the plate 5, and projects angularly from the yoke at the respective end of the opening thereof, and an angular or L-shaped dog 9 has one arm pivoted to the standard 8, and its other arm projects within the opening of the yoke and has a series of teeth 10 to engage the pipe P which passes through the yoke. The toothed arm of the dog 9 is provided with flanges or wings 10ᵃ at the opposite sides of the teeth 10, and said flanges straddle the pipe to hold the dog 9 and pipe P properly assembled.

The inner end of the plate 5 is provided with a portion 11 turned to one side and projecting angularly from the yoke at that end of the opening of the yoke opposite the standard 8, the portion 11 projecting in a direction opposite to the direction in which the standard 8 projects. A bifurcated or U-shaped lever 12 straddles and is pivoted to the portion 11, as at 13, the pivot element or pin 13 being preferably removable and the lever 12 having a series of apertures for the reception of the pin 13 whereby the lever 12 may be adjusted to accommodate various sizes or diameters of pipes. The open end of the lever 12 projects toward the dog 9, and a dog 14 having a curved toothed face is provided between its ends with an ear 15 pivoted within the open end of the lever 12. One end of the oscillatory dog 14 is connected by means of a coiled wire retractile spring 16 with the remote end of the lever 12, and said end of the lever is connected by a coiled wire retractile spring 17 with the plate 5 of the yoke. The spring 17 normally pulls the respective arm of the lever 12 toward the plate 5, whereby the other arm of the lever which carries the dog 14 is swung toward the dog 9 to move the dog 14 correspondingly, and the spring 16 normally holds the respective end of the dog 14 toward the lever 12 whereby the other end of the dog 14 is swung toward the dog 9. The dogs 9 and 14 are arranged to bite the opposite sides of the pipe to thereby grip the pipe so that the pipe will be moved with the yoke when the yoke is reciprocated.

The actuating mechanism for reciprocating the yoke 2 embodies a lever 18 fulcrumed between its ends upon a transverse fulcrum pin 19 carried by the central portion of the frame 1, and the lever 18 has a short arm provided with a fork 20 whose arms or branches are connected by means of links 21 with the intermediate portions of the bars 3 of the yoke 2, whereby when the lever 18 is oscillated, the yoke 2 is reciprocated. The end of the long arm of the lever 18 is connected by links 22 with the short arm of a lever 23 fulcrumed between its ends upon a transverse fulcrum pin 24 carried by the frame 1, and the long arm of the lever 23 is in turn connected by means of links 25 with the short arm of a hand lever 26 fulcrumed between its ends upon a transverse fulcrum pin 27 carried by the frame. The links 25 cross the lever 18, and the levers 23 and 26 are disposed at opposite sides of the lever 18. The hand lever 26 has a long arm adapted to be swung manually, whereby the yoke 2 will be reciprocated with considerable power, the several levers providing a powerful purchase or leverage.

The stationary pipe gripping means carried by the frame 1 embodies a toothed dog 28 carried by the intermediate portion of a U-shaped member 29 straddling the transverse portion 30 of the frame and secured thereto in any suitable manner. The dog 28 has opposite flanges or wings 31, the same as the dog 9, for guiding the pipe therebetween. The stationary pipe gripping means also includes an oscillatory toothed dog 32 pivoted upon a transverse pivot pin 33 carried by the frame adjacent the dog 28. The pipe 33 passes between the dogs 28 and 32 to be gripped thereby, whereby the pipe is prevented from retrograde or return movement.

A bail 34 is terminally attached to the frame 1 at one corner thereof, whereby said bail may be used for anchoring the frame upon the ground or other surface upon which the frame 1 is set, when the pipe is to be pulled horizontally.

When the device is used for lifting or raising a pipe from a well, the frame 1 is set upon the ground in an upright position, as illustrated in Fig. 1, with the upper portion of the pipe P passing through the upper and lower pipe gripping means. The dog 32 swinging against the pipe will bite the same and will force the pipe against the dog 28, whereby the pipe is prevented from dropping, the dog 32 swinging upwardly to allow the pipe to be moved upwardly without interference. When the lever 26 is oscillated, the yoke 2 will be reciprocated vertically in a powerful manner.

When the yoke 2 is raised, the dog 14 will bite the pipe and this will tend to swing the respective arm of the lever 12 downwardly, to cause the pipe to be tightly gripped between the dogs 14 and 9, this action being facilitated by the springs 16 and 17, since the spring 17 will tend to swing that arm of the lever 12 carrying the dog 14 toward the dog 9, and the spring 16 will tend to swing the respective end of the cam-shaped dog 14 toward the dog 9. As a result, when the yoke is raised, the pipe will be tightly gripped or held by the dogs 9 and 14, so that the pipe will be raised with the yoke. When the yoke 2 is lowered, the upper stationary pipe gripping means prevents the lowering of the pipe, and the dog 14 can release its hold upon the pipe to obtain a new hold thereon with the dog 9 when the yoke reaches its lowermost position. When the yoke is lowered, the dog 14 can swing against the tension of the spring 16, and the lever 12 can swing against the tension of the spring 17 to allow the dog 14 to move downwardly along the pipe without difficulty. The pivotal mounting of the dog 9 also enables said dog to move downwardly along the pipe without difficulty, and the pivotal mounting of the dog 9 also enables said dog to conform to the position in which the pipe passes through the frame since the dog 9 will swing to bring the teeth 10 thereof into proper engagement with the respective side of the pipe.

This device is not only useful for raising or extracting pipes from wells, but can be used for various other purposes. When the frame 1 is set upon the ground with the levers 18, 22 and 26 projecting upwardly, the device can be used for pulling a pipe over the ground, within a ditch, and the like, the bail 34 enabling the frame to be anchored to the ground to prevent the movement of the frame when the mechanism is operated.

Having thus described the invention, what is claimed as new is:

1. In a device of the character described, a yoke, a toothed dog carried thereby, a spring pressed lever fulcrumed to the yoke, and a spring pressed dog pivoted to the lever and coöperable with the first mentioned dog.

2. In a device of the character described, a yoke, a toothed dog carried thereby, a lever fulcrumed to the yoke, a toothed cam-shaped dog pivoted to the lever and coöperable with the first mentioned dog, spring means between the yoke and lever for swinging the lever toward the first mentioned dog, and spring means between the lever and second mentioned dog for swinging the second mentioned dog toward the first mentioned one.

3. In a device of the character described, a yoke having a standard, an L-shaped dog having one arm pivoted to said standard and having its other arm toothed and projecting within the yoke, and a swinging toothed dog carried by the yoke and coöperable with aforesaid dog.

4. In a device of the character described, a frame, a yoke embodying a pair of bars having intermediate portions offset away from one another and having their terminals secured together, one terminal of one of said bars being extended to provide a guide wing, a plate secured between those terminals of the bars remote from said guide wing and providing a guide wing, said guide wings slidably engaging the frame, a lever fulcrumed to the frame and having a fork, links connecting the branches of said fork and said bars, a standard secured between those terminals of said bars remote from said plate, an L-shaped dog having one arm pivoted to said standard and having its other arm toothed and projecting within the yoke, said plate having a portion projecting from the yoke in a direction opposite to the direction in which the said standard projects, a lever fulcrumed between its ends to said portion, a retractile spring connecting one end of said lever and said plate, a dog having a curved toothed face and pivoted between its ends to the other arm of said lever to coöperate with the first mentioned dog, and a retractile spring connecting one end of the second mentioned dog and the lever for swinging the other end of the second mentioned dog toward the first mentioned dog.

In testimony that I claim the foregoing as my own, I have hereto affixed my signature in the presence of two witnesses.

CHAS. H. KLEINHEIM.

Witnesses:
J. F. NOEL,
W. W. THOMAS.

Copies of this patent may be obtained for five cents each, by addressing the "Commissioner of Patents, Washington, D. C."